United States Patent

Jang

(10) Patent No.: US 10,221,748 B2
(45) Date of Patent: Mar. 5, 2019

(54) STRUCTURE OF WARM-UP CATALYTIC CONVERTER FOR HIGH-POWER ENGINE

(71) Applicant: HYUNDAI MOTOR COMPANY, Seoul (KR)

(72) Inventor: Chun-Soon Jang, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 137 days.

(21) Appl. No.: 15/369,392

(22) Filed: Dec. 5, 2016

(65) Prior Publication Data

US 2018/0058301 A1 Mar. 1, 2018

(30) Foreign Application Priority Data

Sep. 1, 2016 (KR) .................. 10-2016-0112680

(51) Int. Cl.

| F01N 13/18 | (2010.01) |
|---|---|
| B01D 53/94 | (2006.01) |
| F01N 3/28 | (2006.01) |
| F01N 13/16 | (2010.01) |

(52) U.S. Cl.
CPC ......... *F01N 13/1838* (2013.01); *B01D 53/94* (2013.01); *F01N 3/28* (2013.01); *F01N 3/2853* (2013.01); *F01N 13/16* (2013.01); *F01N 13/1805* (2013.01); *F01N 13/1861* (2013.01); *B01D 2258/01* (2013.01); *F01N 2340/02* (2013.01); *F01N 2450/22* (2013.01); *F01N 2530/04* (2013.01)

(58) Field of Classification Search
None
See application file for complete search history.

(56) References Cited

U.S. PATENT DOCUMENTS

| 3,798,006 A * | 3/1974 | Balluff ................. F01N 3/2853 422/179 |
|---|---|---|
| 2006/0233681 A1 | 10/2006 | Hartmann |
| 2015/0121845 A1* | 5/2015 | Wirth .................... F01N 3/2853 60/272 |

FOREIGN PATENT DOCUMENTS

| JP | 09-170429 A | 6/1997 |
|---|---|---|
| JP | 4047665 B2 | 2/2008 |
| JP | 2008-057509 A | 3/2008 |
| JP | 2008057509 A * | 3/2008 |
| JP | 2011-256785 A | 12/2011 |
| KR | 10-2004-0088644 A | 10/2004 |
| KR | 10-2009-0064206 A | 6/2009 |

OTHER PUBLICATIONS

Kimura et al. JP2008-057509A—translated document (Year: 2008).*
DieselNet. Cellular Monolith Substrates. DieselNet Technology Guide. https:www.dieselnet.com/tech/cat_substrate.php (Year: 1998).*

* cited by examiner

*Primary Examiner* — Walter D. Griffin
*Assistant Examiner* — Jelitza M Perez
(74) *Attorney, Agent, or Firm* — Morgan Lewis & Bockius LLP

(57) ABSTRACT

A structure of a warm-up catalytic converter (WCC) for a high power engine may include a front cone transferring exhaust gas to a catalyst carrier, a mat supporting the catalyst carrier, and a shell surrounding the mat and being directly coupled with the front cone. An interior diameter of the front cone is equal to or longer than an exterior diameter of the shell.

6 Claims, 4 Drawing Sheets

--PRIOR ART--

--PRIOR ART--

STRUCTURE OF WARM-UP CATALYTIC CONVERTER FOR HIGH-POWER ENGINE

CROSS-REFERENCE TO RELATED APPLICATION

This application claims the benefit of priority to Korean Patent Application No. 10-2016-0112680 filed in the Korean Intellectual Property Office on Sep. 1, 2016, which is incorporated herein by reference in its entirety.

TECHNICAL FIELD

The present disclosure relates to a structure of a warm-up catalytic converter (WCC) for a high power engine, and more particularly, to a warm-up catalytic converter (WCC) for a high power engine blocking heat being transferred to a rear end of a shell welding portion to a maximum and minimizing thermal stress focus to the rear end of the shell welding portion.

BACKGROUND

CO, HC, NOX, and so on to be harmful to human body are contained to exhaust gas being exhausted from a vehicle engine, and an apparatus for oxidizing or reducing the harmful exhaust gas to CO2, H2O, N2, and so on to be harmless is a catalytic converter.

As a catalytic converter applying an exhaust system of a vehicle, an exhaust manifold catalytic converter (MCC) and an underflow catalytic converter (UCC), which are mounted to a downstream end portion of an exhaust manifold, have been used. Particularly, the MCC catalyst is mounted at a downstream end portion of the exhaust manifold in which a temperature of exhaust gas is relatively high, in order to revitalize a catalyst as fast as possible on starting and cooling of an engine.

A warm-up catalytic converter (WCC) effectively oxidizing not only a CO element and a HC element but also a SOF element which are contained in exhaust gas is applied for responding to the exhaust gas regulation which is recently to be reinforced.

FIG. 1 is a schematic diagram of a structure of a warm-up catalytic, and FIG. 2 is a cross-sectional view of A of FIG. 1 according to a conventional art. Referring to FIG. 1 and FIG. 2, a shell extends toward a front cone such that the shell and the front cone are engaged by welding in a conventional art. At this time, a stainless steel (SUS) cast steel is mostly used as a material of the front cone, and a general SUS material (particularly, SUS4 stainless steel) is mostly used as a material of the shell.

The above mentioned conventional art can be stably used on the ordinary engine output, but there is a problem that a crack is generated at a rear end of a shell welding portion by thermal fatigue accumulation and thermal stress focus in a high power engine which is recently applied. Particularly, a structure of a warm-up catalytic converter (WCC) may have been altered to be bent because an interior space of an engine compartment is small when a high power engine is mounted to a small vehicle, and in this case, there is a problem that durability is frequently deteriorated as thermal fatigue accumulation and thermal stress focus rapidly occur.

The foregoing is intended merely to aid in the understanding of the background of the present disclosure, and is not intended to mean that the present disclosure falls within the purview of the related art that is already known to those skilled in the art.

SUMMARY

The present disclosure has been made in an effort to provide a structure of a warm-up catalytic converter (WCC) for a high power engine having advantages of blocking heat being transferred to a rear end of a shell welding portion to the maximum and minimizing thermal stress focus to the rear end of the shell welding portion by forming so that a front cone is formed to cover a shell in an exterior and the front cone and a mat are overlapped (i.e. overlap) to each other.

A structure of a warm-up catalytic converter (WCC) for a high power according to a first exemplary embodiment of the present disclosure may include: a front cone transferring exhaust gas exhausted to a catalyst carrier; a mat supporting the catalyst carrier; and a shell surrounding the mat and being directly coupled with the front cone, and an interior diameter of the front cone may be equal to or greater than an exterior diameter of the shell.

The front cone and the shell may be engaged by welding a downstream end portion of an overlapping portion of the front cone and the shell.

With respect to a horizontal direction, an upstream end portion of the mat may be formed to be extended upwardly such that the front cone and the mat overlap at a predetermined length.

The upstream end portion of the mat is formed to be lower than an upstream end portion of the catalyst carrier.

A thickness of a downstream end portion of the front cone may be gradually decreased from a main part of the front cone to an overlapping portion of the front cone and the shell.

A material of the front cone may be a SUS cast steel, and the front cone may be casting-manufactured such that a thickness of the downstream end portion of the front cone has a shape of being gradually decreased from an upstream end portion of the overlapping portion of the front cone and the shell toward the downstream end portion thereof.

A material of the front cone may be a SUS cast steel, and the front cone may be cutting-manufactured such that a thickness of the downstream end portion of the front cone has a shape of being gradually decreased from an upstream end portion of the overlapping portion of the front cone and the shell toward the downstream end portion thereof.

A material of the front cone may be a SUS board, and a thickness of a downstream end portion of the front cone may be maintained to be uniform.

According to the present invention, durability of a warm-up catalytic converter can be improved by minimizing thermal stress focus being generated depending on material difference between a front cone and a shell.

BRIEF DESCRIPTION OF THE DRAWINGS

The above and other objects, features and advantages of the present disclosure will be more clearly understood from the following detailed description taken in conjunction with the accompanying drawings, in which.

DETAILED DESCRIPTION

Terms and words used in the present specification and claims are not to be construed as a general or dictionary meaning, but are to be construed as meaning and concepts meeting the technical ideas of the present disclosure based on a principle that the present inventors may appropriately define the present disclosure as the concepts of terms in order to describe their disclosures in best mode. Therefore, the configurations described in the exemplary embodiments and drawings of the present disclosure are merely exemplary embodiments but do not represent all of the technical spirit of the present disclosure. Thus, the present disclosure should be construed as including all the changes, equivalents, and substitutions included in the spirit and scope of the present disclosure at the time of filing this application. Further, in the description of the present disclosure, the detailed description of related well-known configurations and functions is not provided, when it is determined as unnecessarily making the scope of the present disclosure unclear. An exemplary embodiment of the present disclosure will hereinafter be described in detail with reference to the accompanying drawings.

Figure 1:
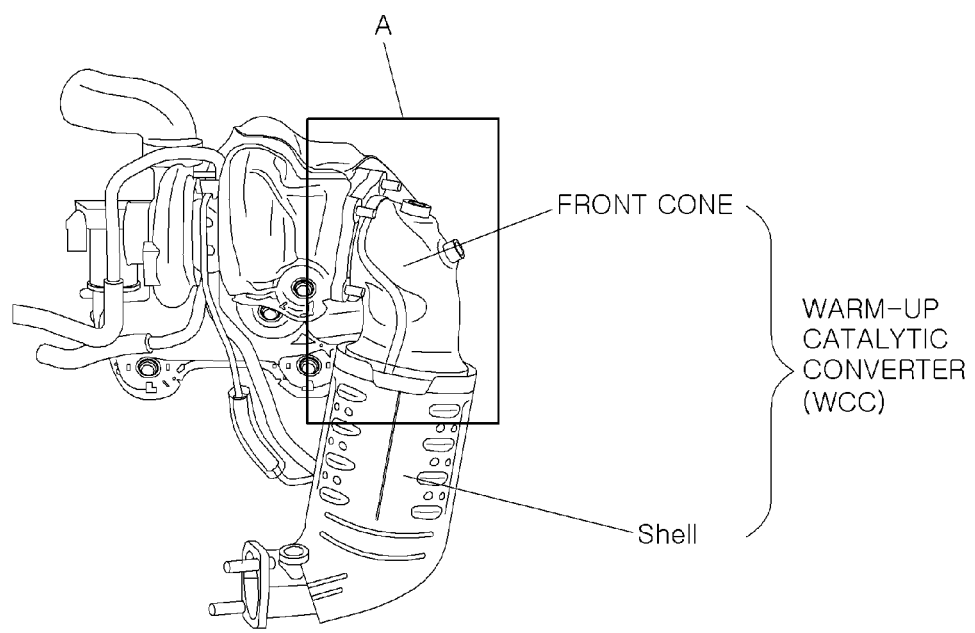
FIG. 1 is a schematic diagram of a structure of a warm-up catalytic.
Figure 2:
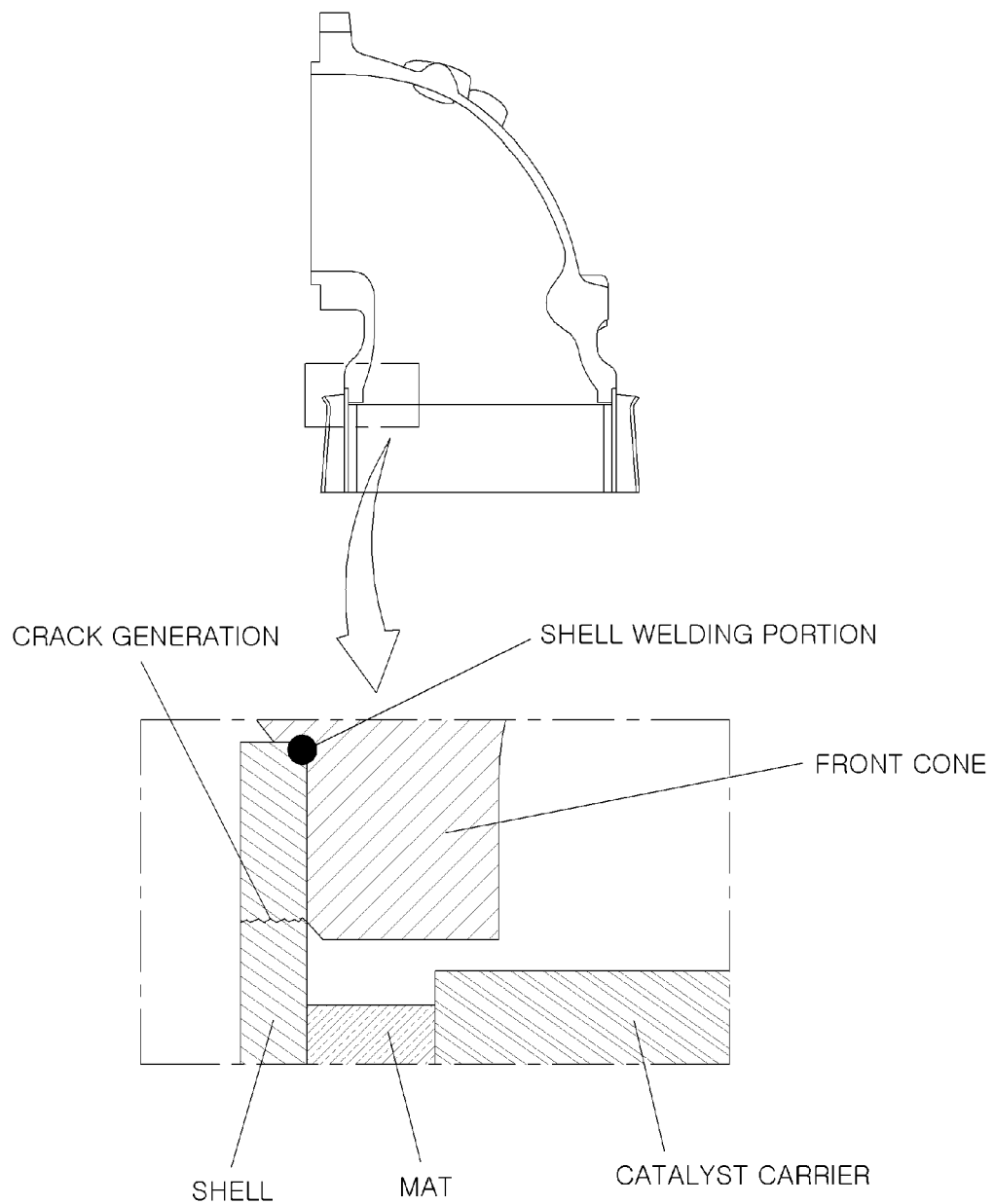
FIG. 2 is a cross-sectional view of A of FIG. 1 according to a conventional art.
Figure 3:
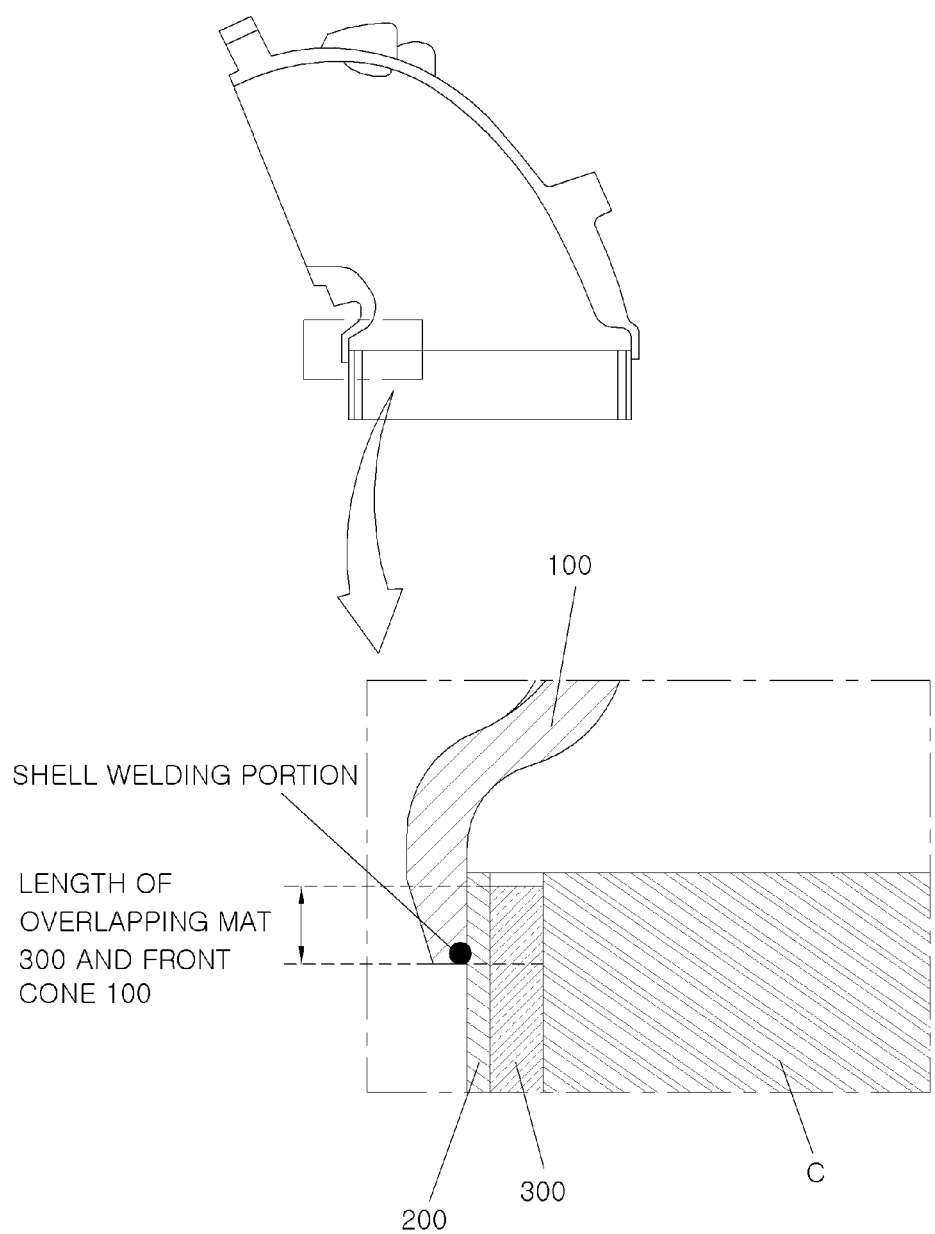
FIG. 3 is a cross-sectional view of A of FIG. 1 according to a first exemplary embodiment of the present disclosure.

FIG. 3 is a cross-sectional view of A of FIG. 1 according to a first exemplary embodiment of the present disclosure. Referring to FIG. 3, a structure of a warm-up catalytic converter (WCC) for a high power engine according to a first exemplary embodiment of the present disclosure includes a front cone 100, a shell 200, and a mat 300, and particularly, has a feature whereby an interior diameter of the front cone 100 is equal to or greater than an exterior diameter of the shell 200.

The front cone 100 functions to transfer exhaust gas exhausted from an exhaust manifold to a catalyst carrier C, and the mat 300 supports the catalyst carrier C. In addition, the mat 300 may function as an insulator blocking that heat of exhaust gas having a high temperature is transferred from the catalyst carrier C to the shell 200.

The shell 200 surrounds the mat 300 to be directly engaged to the front cone 100. That is, the shell 200 and the front cone 100 function as a housing of a warm-up catalytic converter (WCC). At this time, a thickness of the shell 200 may be 1.2 mm-2.0 mm, but it is not limited thereto, so the thickness may be differently set depending on purpose of a designer or output power of an engine.

A structure of a warm-up catalytic converter (WCC) for a high power engine according to a first exemplary embodiment of the present disclosure has a structure that the front cone 100 is disposed outside the shell 200, and the front cone 100 and the shell 200 are welded to each other. At this time, the front cone 100 and the shell 200 are engaged by welding a downstream end portion of an overlapping portion of the front cone 100 and the shell 200.

In addition, an upstream end portion of the mat 300 is formed to be extended upwardly such that the front cone 100 and the mat 300 are overlapped with a predetermined length with respect to a horizontal direction.

That is, the front cone 100 extends from an upstream end portion of the shell 200 downwardly and the mat 300 extends upwardly such that heat of exhaust gas having a high temperature is blocked from being transferred from the catalyst carrier C to the welding portion of the shell 200.

At this time, the predetermined length may be 5 mm, but it is not limited thereto, so the length may be differently set depending on purpose of a designer or output power of an engine. In addition, it is desirable to prevent thermal stress focus depending on thermal expansion coefficient difference between the front cone 100 and the shell 200 by minimizing a thickness of the welding portion of the shell 200.

Further, the upstream end portion of the mat 300 is disposed to be lower than the upstream end portion of the catalyst carrier C. This is for preventing that the mat 300 is corroded as the mat 300 directly contacts with exhaust gas having a high temperature.

In addition, in a structure of a warm-up catalytic converter (WCC) for a high power engine according to a first exemplary embodiment of the present disclosure, a thickness of a downstream end portion of the front cone 100 is gradually decreased from an upstream end portion of the overlapping portion the front cone 100 and the shell 200 toward a downstream end portion thereof. Therefore, thermal mass of the front cone 100 to be near with the shell welding portion which is directly contacted with exhaust gas having a high temperature can be decreased, and thus, heat being transferred from the front cone 100 to the shell welding portion and shell 200 can be reduced. A thickness of the downstream end portion of the front cone 100 may be 4 mm, and a thickness of the downstream end portion of the front cone 100 may be set with 2.5 mm-3 mm, but it is not limited thereto, so that the thicknesses may be differently set depending on purpose of a designer or output power of an engine.

At this time, a material of the front cone 100 may be a stainless steel (SUS) cast steel, and the front cone 100 may be casting-manufactured such that the thickness of the downstream end portion of the front cone 100 has a shape of being gradually decreased from the upstream end portion of the overlapping portion of the front cone 100 and the shell 200 toward the downstream end portion thereof. In addition, a material of the front cone 10Q may be a SUS cast steel, and the front cone 100 may be cutting-manufactured such that a thickness of the downstream end portion of the front cone 100 has a shape of being gradually decreased from the upstream end portion of a the overlapping portion the front cone 100 and the shell 200 toward a downstream end portion thereof. That is, a casting-manufacture or a cutting-manufacture may be performed for forming the downstream end portion of the front cone 100 having the above mentioned shape, but it is not limited thereto, so it is possible that the above mentioned shape is formed by a different manufacture.

Figure 4:
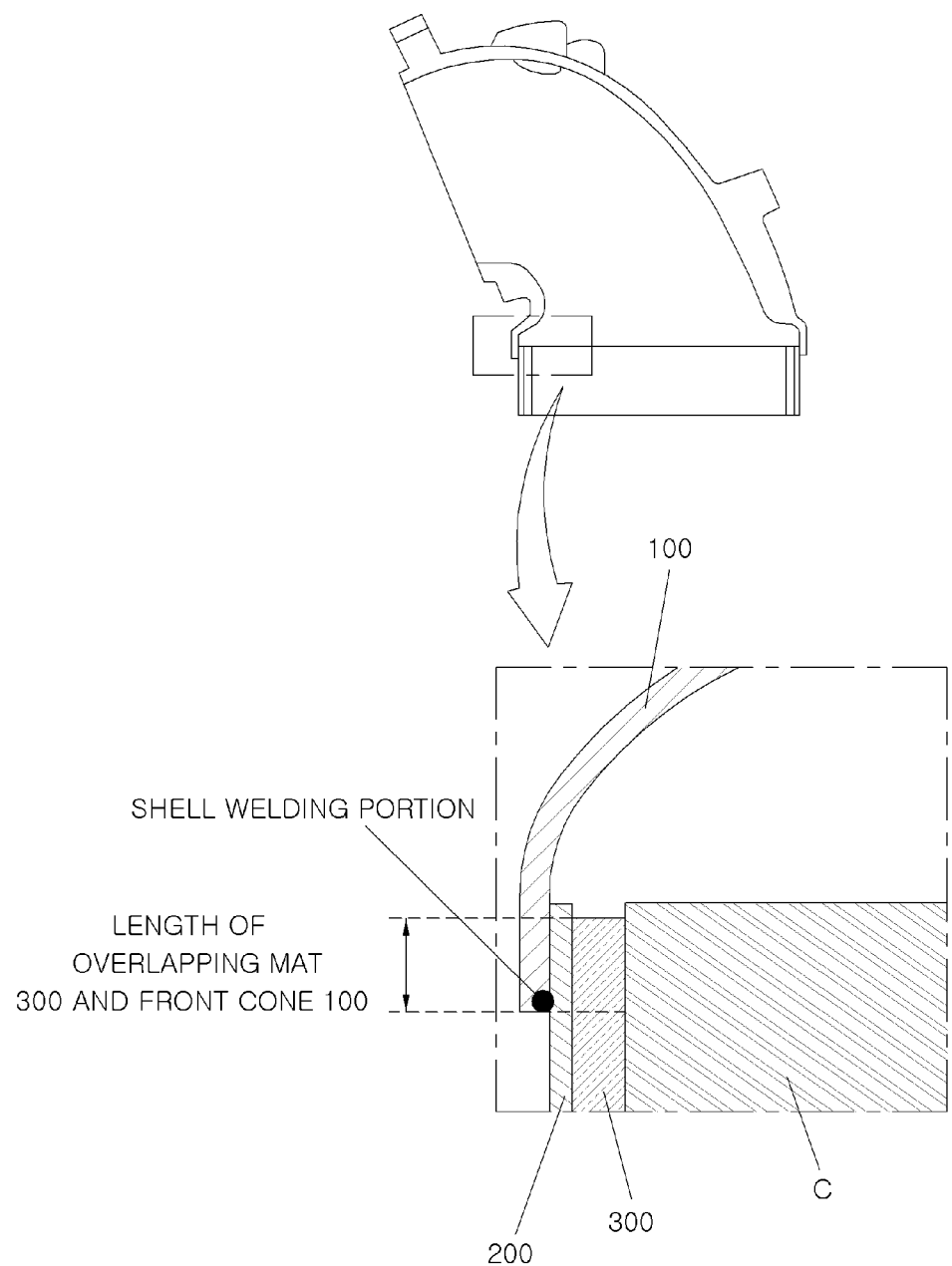
FIG. 4 is a cross-sectional view of A of FIG. 1 according to a second exemplary embodiment of the present disclosure.

FIG. 4 is a cross-sectional view of A of FIG. 1 according to a second exemplary embodiment of the present disclosure. Referring to FIG. 4, in a structure of a warm-up catalytic converter (WCC) for a high power engine according to a second exemplary embodiment of the present disclosure, the structure thereof is mostly similar to the first exemplary embodiment. There are differences that a material of the front cone 100 is a SUS board and a thickness of the downstream end portion of the front cone 100 is maintained to be uniform in a structure of a warm-up catalytic converter (WCC) for a high power engine according to a second exemplary embodiment of the present disclosure.

That is, a second exemplary embodiment of the present disclosure is adapted so that there is no advantage about durability, however, there is advantage whereby a manufacture is easy by manufacturing by using a SUS board and not performing an additional manufacture to the downstream end portion in comparison with the first exemplary embodiment of the present disclosure.

A below illustrated Table 1 is a table for describing effects of the present disclosure.

TABLE 1

|  | Conventional art | Present disclosure |
| --- | --- | --- |
| Temperature of shell welding portion (high power engine operation) | Celsius 499 degrees | Celsius 355 degrees |
| Equivalent plastic strain (PEEQ) | 0.65% | 0.27% (58% decrease in comparison with conventional art) |

Referring to Table 1, a temperature of the shell welding portion is measured with Celsius 499 degrees in case of applying a structure of a warm-up catalytic converter (WCC) according to a conventional art, and a temperature of the shell welding portion is measured with Celsius 355 degrees in case of applying a structure of a warm-up catalytic converter (WCC) for a high power engine according to the present disclosure.

That is, it is proved that a temperature of the shell welding portion is decreased as about Celsius 144 degrees by applying a structure of a warm-up catalytic converter (WCC) for a high power engine according to the present disclosure.

In addition, regarding a equivalent plastic strain, it is 0.65% in case of applying a structure of a warm-up catalytic converter (WCC) according to a conventional art, but it is 0.27% in case of applying a structure of a warm-up catalytic converter (WCC) for high power engine according to the present disclosure.

That is, it is proved that an equivalent plastic strain of the shell welding portion is decreased as about 58% and a thermal stress of the shell welding portion is decreased by applying a structure of a warm-up catalytic converter (WCC) for a high power engine according to the present invention. Therefore, it is also proved that durability of a warm-up catalytic converter (WCC) is improved by applying a structure of a warm-up catalytic converter (WCC) for a high power engine according to the present disclosure.

The exemplary embodiment as discussed previously is merely a desirable embodiment which may enable a person (hereinafter referred to as 'a skilled person in the relevant technology'), who has a typical knowledge in a technology field that the present disclosure belongs to, to execute the present disclosure easily, but the present invention is not limited to the aforesaid exemplary embodiment and the attached drawings, and hence this does not result in limiting the scope of right in this invention. Therefore, it will be apparent to a skilled person in the relevant technology that several transposition, transformation, and change is possible within a scope of not deviating from the technological thought in the present disclosure and it is obvious that a easily changeable part by a skilled person in the relevant technology is included within the scope of right in the present disclosure as well.

What is claimed is:

1. A structure of a warm-up catalytic converter (WCC) for a high power engine comprising:
    a front cone transferring exhaust gas to a catalyst carrier;
    a mat supporting the catalyst carrier; and
    a shell surrounding the mat and directly coupled with the front cone,
    wherein an interior diameter of the front cone is equal to or greater than an exterior diameter of the shell, and
    wherein a thickness of a downstream end portion of the front cone is gradually decreased from a main part of the front cone to an overlapping portion of the front cone and the shell.

2. The structure of claim 1, wherein the front cone and the shell are engaged by welding a downstream end portion of the overlapping portion of the front cone and the shell.

3. The structure of claim 2, wherein an upstream end portion of the mat extends upwardly such that the front cone and the mat overlap at a predetermined length with respect to a horizontal direction.

4. The structure of claim 3, wherein the upstream end portion of the mat is disposed lower than an upstream end portion of the catalyst carrier.

5. The structure of claim 2, wherein a material of the front cone is a stainless (SUS) cast steel, and the front cone is casting-manufactured such that the thickness of the downstream end portion of the front cone has a shape of being gradually decreased from an upstream end portion of the overlapping portion of the front cone and the shell toward the downstream end portion of the overlapping portion of the front cone and the shell.

6. The structure of claim 2, wherein a material of the front cone is a SUS cast steel, and
    the front cone is cutting-manufactured such that the thickness of the downstream end portion of the front cone has a shape of being gradually decreased from an upstream end portion of the overlapping portion of the front cone and the shell toward the downstream end portion of the overlapping portion of the front cone and the shell.

* * * * *